United States Patent
Zhang et al.

(10) Patent No.: US 11,561,348 B2
(45) Date of Patent: Jan. 24, 2023

(54) OPTICAL ALIGNMENT SYSTEMS AND METHODS

(71) Applicant: Alpine Optoelectronics, Inc., Fremont, CA (US)

(72) Inventors: Xingyu Zhang, Fremont, CA (US); Tongqing Wang, Fremont, CA (US); Dawei Zheng, Fremont, CA (US)

( * ) Notice: Subject to any disclaimer, the term of this patent is extended or adjusted under 35 U.S.C. 154(b) by 148 days.

(21) Appl. No.: 16/949,734

(22) Filed: Nov. 12, 2020

(65) Prior Publication Data
US 2022/0146753 A1     May 12, 2022

(51) Int. Cl.
| | |
|---|---|
| *H04B 10/25* | (2013.01) |
| *G02B 6/293* | (2006.01) |
| *G02B 6/30* | (2006.01) |
| *G02B 6/42* | (2006.01) |
| *G02B 6/12* | (2006.01) |
| *H04B 10/80* | (2013.01) |
| *H04J 14/02* | (2006.01) |
| *H04Q 11/00* | (2006.01) |

(52) U.S. Cl.
CPC ....... *G02B 6/2938* (2013.01); *G02B 6/12007* (2013.01); *G02B 6/29332* (2013.01); *G02B 6/30* (2013.01); *G02B 6/4246* (2013.01); *G02B 6/4274* (2013.01); *H04B 10/25* (2013.01); *H04B 10/801* (2013.01); *H04J 14/022* (2013.01); *H04J 14/02* (2013.01); *H04Q 2011/0022* (2013.01)

(58) Field of Classification Search
None
See application file for complete search history.

(56) References Cited

U.S. PATENT DOCUMENTS

| | | | | |
|---|---|---|---|---|
| 5,907,417 A | * | 5/1999 | Darcie | H04J 14/0246 398/20 |
| 6,934,438 B2 | * | 8/2005 | Hoke | G02B 6/359 385/16 |
| 7,378,861 B1 | * | 5/2008 | Malendevich | G02B 6/30 324/754.23 |
| 8,798,456 B2 | * | 8/2014 | Skirmont | H04B 10/0779 398/19 |

(Continued)

FOREIGN PATENT DOCUMENTS

| | | | | | |
|---|---|---|---|---|---|
| CN | 112904501 A | * | 6/2021 | | G02B 6/4225 |
| FI | 20196094 A1 | * | 7/2021 | | G02B 6/30 |

*Primary Examiner* — Li Liu
(74) *Attorney, Agent, or Firm* — Cionca IP Law P.C.; Marin Cionca (57) ABSTRACT

A system for optically aligning a photonics die to a fiber array, the fiber array comprising a first and a second fiber channels, the system comprising: the photonics die having: a first and a second optical channels; a first and a second wavelength division multiplexing (WDM) couplers each comprising a bar port, a cross port, and a common port, the first and the second WDM couplers being optically connected to the first and the second optical channels, respectively, via the bar ports and the common ports; and a waveguide crossing optically connecting the cross ports of the first and the second WDM couplers; the system being adapted to couple an optical signal received from the first fiber channel into the cross port of the first WDM coupler and into the waveguide crossing, the optical signal being propagated from the waveguide crossing into the cross port of the second WDM coupler.

20 Claims, 4 Drawing Sheets

(56) References Cited

U.S. PATENT DOCUMENTS

| | | | | |
|---|---|---|---|---|
| 9,423,561 B1* | 8/2016 | Chou | ............... | G02B 6/30 |
| 9,529,154 B2* | 12/2016 | Van Steenberge | ... | G02B 6/1228 |
| 9,651,747 B1* | 5/2017 | Barwicz | ............... | G02B 6/4292 |
| 10,288,812 B1* | 5/2019 | Evans | ............... | G02B 6/30 |
| 10,715,270 B2* | 7/2020 | Aida | ............... | H04J 14/0212 |
| 2002/0071633 A1* | 6/2002 | Kimura | ............... | G02B 6/4246 |
| | | | | 385/24 |
| 2002/0097963 A1* | 7/2002 | Ukechi | ............... | G02B 6/29368 |
| | | | | 385/129 |
| 2003/0123827 A1* | 7/2003 | Salerno | ............... | B82Y 20/00 |
| | | | | 385/27 |
| 2004/0057653 A1* | 3/2004 | Fukuda | ............... | G02B 6/42 |
| | | | | 385/37 |
| 2009/0214221 A1* | 8/2009 | Li | ............... | H04B 10/40 |
| | | | | 398/136 |
| 2010/0135619 A1* | 6/2010 | Choi | ............... | G02B 6/42 |
| | | | | 385/88 |
| 2010/0322555 A1* | 12/2010 | Vermeulen | ............... | G02B 6/34 |
| | | | | 385/28 |
| 2012/0170938 A1* | 7/2012 | Evans | ............... | H04B 10/40 |
| | | | | 398/91 |
| 2013/0308906 A1* | 11/2013 | Zheng | ............... | G02B 6/4214 |
| | | | | 29/592 |
| 2015/0222968 A1* | 8/2015 | Garcia | ............... | H04Q 11/0005 |
| | | | | 398/48 |
| 2017/0205592 A1* | 7/2017 | Pfnuer | ............... | G02B 6/423 |
| 2018/0062748 A1* | 3/2018 | Mack | ............... | G02B 6/0288 |
| 2019/0324201 A1* | 10/2019 | Celo | ............... | G02B 6/122 |
| 2019/0331859 A1* | 10/2019 | Spannagel | ............... | G02B 6/122 |
| 2020/0158961 A1* | 5/2020 | Fini | ............... | G02B 6/30 |
| 2021/0173145 A1* | 6/2021 | Fasano | ............... | G02B 6/1225 |
| 2021/0257288 A1* | 8/2021 | Meade | ............... | H01L 23/49838 |

* cited by examiner

OPTICAL ALIGNMENT SYSTEMS AND METHODS

BACKGROUND OF INVENTION

1. Field of the Invention

The invention relates generally to optical alignment systems and methods, and more specifically to passive optical alignment systems and methods for coupling a multi-channel integrated photonics die to a fiber array.

2. Description of the Related Art

In the field of integrated photonics, optical alignment between photonic integrated circuits, such as photonics dies and chips, and optical components, such as fibers and fiber arrays, with high coupling efficiency continues to be a challenge, particularly due to cost constraints. One such integrated photonics application is the optical coupling of a multi-channel photonics die to a fiber array. Input light from a laser source is coupled into a first edge coupler of the photonics die through a lens and then split into multiple paths/channels within the photonics die. A fiber array having the same number of channels is positioned along edge couplers of the photonics die to couple the laser light out of the photonics die. Current optical alignment systems and methods may utilize active components for coupling a photonics die to a fiber array, that is, components requiring an external power source, which increases manufacturing and operational costs. Furthermore, current optical alignment systems and methods may require high precision when positioning the on-chip coupling structures with the external optical fibers and arrays, as will be discussed below.

One common approach taken for optically aligning a photonics die to a fiber array is the use of active optical components, as mentioned above, for active monitoring of coupled input light. In such systems, a monitor photodiode is integrated onto the photonics die such that to measure the photocurrent, and thus the light power, of the incoming laser light. The fiber array is then optically aligned with the active photonics die by monitoring the output light power at the output end of the fiber array. In another exemplary approach using an on-chip photodiode, optical alignment occurs from the back end, such that light is launched into the photonics die from the fiber array. The on-chip photodiode measures the light power traveling in this reverse direction such that to optically align the photonics die with the fiber array. In both of the approaches described above, a photodiode must be integrated onto the photonics die, and the photodiode must be supplied external power such that to measure photocurrent and therefore light power. Furthermore, proper probing or wire-bonding is required for the necessary electrical connections between the photodiode and the on-chip waveguides, which thus increase product manufacturing and operational costs.

In order to avoid using on-chip photodiodes, as described above, passive optical alignment systems and methods have been developed requiring no external power source. One such approach involves implementing a reference loop on the photonics die, such that input light is coupled between the photonics die and the fiber array via the reference loop. However, such an approach requires the integration of two additional channels on the photonics die and on the fiber array, which increases the overall size of the photonics die and the fiber array, and thus increases the product manufacturing costs. An alternative approach may be to etch V-shaped grooves into the fiber array and/or corresponding waveguide recesses into the photonics die for physical alignment between the fiber array and the photonics die. However, such an approach requires precise control over the dimensions of the V-shaped grooves and recesses, which entails a complicated manufacturing process.

Furthermore, each of the above described optical alignment systems and methods involve a two-step approach, first coupling the laser light to the photonics die and then the light from the photonics die to the fiber array, which prevents real-time optical adjustment.

Therefore, there is a need to solve the problems described above by providing a system and method for efficient, cost-effective, and real-time passive optical alignment between multi-channel integrated photonics dies and fiber arrays.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an integrated photonics die is provided. The integrated photonics die may comprise: a first and a second optical channels extending a length of the integrated photonics die, the first optical channel comprising a first bidirectional port, and the second optical channel comprising a second bidirectional port; a first and a second wavelength division multiplexing (WDM) couplers each comprising a bar port, a cross port, and a common port, the first and the second WDM couplers being optically connected to the first and the second optical channels, respectively, via the bar ports and the common ports; and a waveguide crossing optically connecting the cross ports of the first and the second WDM couplers; wherein an optical signal being launched into the first optical channel at the first bidirectional port is caused to be coupled out of the first optical channel at the cross port of the first WDM coupler, such that to be propagated through the waveguide crossing, the optical signal then being coupled into the second optical channel at the cross port of the second WDM coupler, the optical signal subsequently being caused to exit from the second optical channel at the second bidirectional port. Thus, an advantage is that the photonics die may be optically aligned to a fiber array while simultaneously transmitting an operating light beam. An additional advantage is that due to the low-loss nature of WDM couplers, transmission losses may be kept to a minimum, the need for hypersensitive end receivers may be negated. Another advantage is that the integrated photonics die may simultaneously operate more than on device at a time, decreasing operational costs associated with having multiple photonics dies.

In another aspect, a system for optically aligning an integrated photonics die to a fiber array is provided, the fiber array comprising a first and a second fiber channels. The system may comprise: the integrated photonics die having: a first and a second optical channels; a first and a second wavelength division multiplexing (WDM) couplers each comprising a bar port, a cross port, and a common port, the first and the second WDM couplers being optically connected to the first and the second optical channels, respectively, via the bar ports and the common ports; and a waveguide crossing optically connecting the cross ports of the first and the second WDM couplers; the system being adapted to couple a first optical signal received from the first fiber channel and having a first wavelength into the cross port of the first WDM coupler and thus into the waveguide crossing, the first optical signal being propagated from the waveguide crossing into the cross port of the second WDM coupler, and thus being coupled into the second optical channel, the first optical signal being subsequently coupled into the fiber array via the second fiber channel. Thus, an advantage is that the photonics die may be optically aligned to the fiber array while transmitting an operating light beam. Another advantage is that, because only passive optical components are used in the optical alignment system, manufacturing costs and operational costs may be kept to a minimum. An additional advantage is that due to the low-loss nature of WDM couplers, transmission losses may be kept to a minimum, the need for hypersensitive end receivers may be negated. Another advantage is that the laser source providing the input light beam need only be turned on for product operation, rather than for optical alignment, which may thus reduce operational costs. Another advantage is that the disclosed optical alignment system may allow multiple devices to pair with the integrated photonics die via the fiber array in real time. Another advantage is that the integrated photonics die may operate more than on device at a time, decreasing operational costs associated with having multiple photonics dies.

In another aspect, a method of optically aligning an integrated photonics die to a fiber array is provided, the fiber array comprising a first and a second fiber channels. The method may comprise the steps of: receiving the integrated photonics die, the integrated photonics die comprising a first and a second optical channels, the first optical channel comprising a first bidirectional port, and the second optical channel comprising a second bidirectional port, a first and a second wavelength division multiplexing (WDM) couplers each comprising a bar port, a cross port, and a common port, the first and the second WDM couplers being optically connected to the first and the second optical channels, respectively, via the bar ports and the common ports, and a waveguide crossing optically connecting the cross ports of the first and the second WDM couplers; aligning an end of the fiber array to an edge of the integrated photonics die, such that the first and the second fiber channels at least partially align with the first and the second bidirectional ports; launching an optical signal from the first fiber channel into the first optical channel via the first bidirectional port; and detecting at least a portion of the optical signal at the second fiber channel, the at least a portion of the optical signal being coupled from the first optical channel to the second optical channel via the first and the second WDM couplers and the waveguide crossing loop, the at least a portion of the optical signal subsequently being coupled from the second optical channel to the second fiber channel via the second bidirectional port. Thus, an advantage is that the photonics die may be optically aligned to the fiber array while simultaneously transmitting an operating light beam. Another advantage is that the disclosed optical alignment method is not limited to photonics dies having edge couplers but may be applied to photonics dies having grating couplers as well, increasing the overall applicability and usability of the method. An additional advantage of the optical alignment method is the enablement of real-time adjustment of the fiber array position while the die is operating. Another advantage is that, because only passive optical components are used in the optical alignment method, manufacturing costs and operational costs may be kept to a minimum. Another advantage is that the laser source providing the input light beam need only be turned on for product operation, rather than for optical alignment, which may thus reduce operational costs.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 115 and 215, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1:
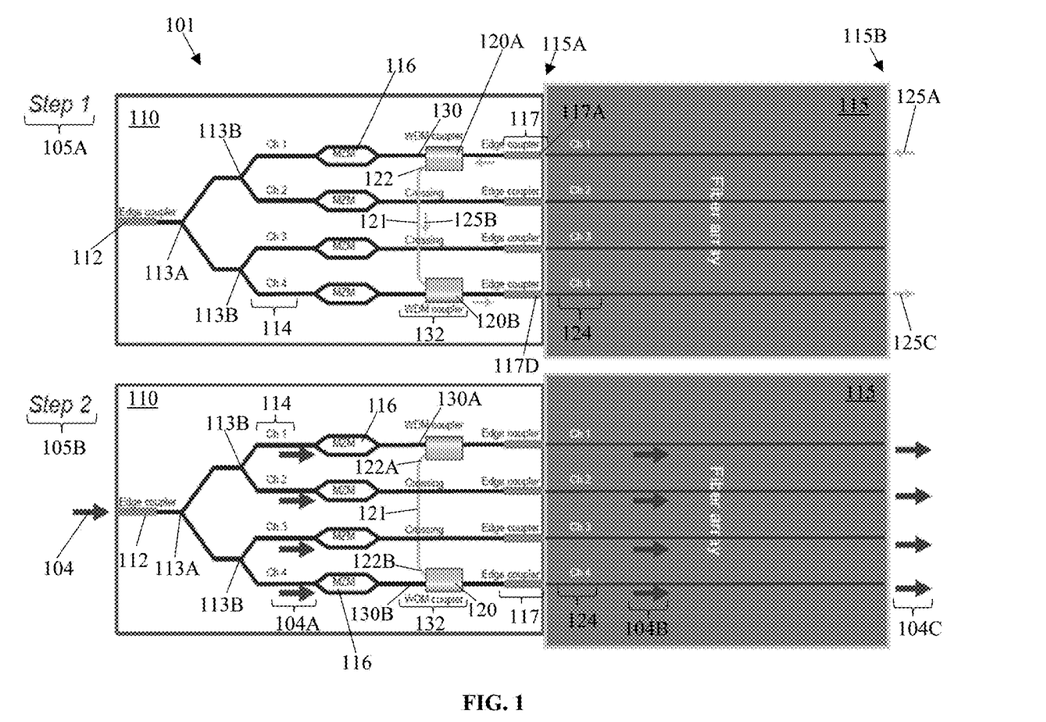
FIG. 1 is a diagram illustrating a two-step method of optically aligning a multi-channel integrated photonics die to a fiber array, according to an aspect.

FIG. 1 is a diagram illustrating a two-step 105A, 105B method 101 of optically aligning a multi-channel integrated photonics die 110 to a fiber array 115, according to an aspect. As shown in FIG. 1, the multi-channel integrated photonics die ("multi-channel integrated photonics die," "integrated photonics die," "photonics die," "transmitter die") 110 and the fiber array 115 (or optical fiber) may be optically coupled such that incident light (e.g., shown by 104) may travel through the fiber array 115 for a particular application (e.g., network communication, telecommunications, information processing, optical sensing, etc.). In such applications, a receiver (not shown), such as a photodetector, for example, may be positioned at an end 115B of the fiber array 115 for receiving the transmitted light (e.g., 104C). As an example, let the photonics die 110 be a transmitter device in 400G DR4 optical transceivers. As shown as an example, the fiber array 115 may comprise a plurality of fibers or fiber channels 124 through which the light/light beams may travel. It should be understood that, as will be used throughout this disclosure, light refers to electromagnetic radiation having an exemplary wavelength. Additionally, it should be understood, as it is known in the art, that light is a type of optical signal. It should also be understood that the relative sizes of the fiber array 115 and the photonics die 110 are depicted as such for simplicity and the particular dimensions shown throughout the drawings are non-limiting. As discussed previously above in the Background, optical alignment methods and systems that utilize active components, such as photodiodes, require external power sources and precise electrical connections for said active components. As will be described throughout this disclosure below, the optical alignment method 101 disclosed herein utilizes mostly passive optical components, saving chip space and driving down manufacturing costs, as advantages.

As shown in FIG. 1, the photonics die 110 may comprise a first bidirectional port, such as an edge coupler 112, for incident light to enter the photonics die 110, as an example. As shown, the edge coupler 112 may branch/split off into multiple paths by which the incident light is to be divided, as will be discussed later below. It should be understood that more than one edge coupler 112 may be provided, such as, for example, two, three, etc., as needed, at the input end of the photonics die. As an example, the photonics die 110 may comprise two distinct branch points 113A, 113B, such that four waveguide or optical channels 114 are created for which light to travel through. The channels 114 may be optical fibers, for example, or any suitable waveguide medium (e.g., semiconductor nanowire). It should be understood that a greater number of channels 114 may be provided on the photonics die 110, and thus a greater number of fiber channels 124 may be provided on the fiber array 115. As shown, each channel 114 may be provided with a modulator, such as a Mach-Zehnder Modulator (MZM), as an example, for controlling the amplitude and/or phase of the optical wave. Each channel 114 may conclude with a bidirectional port, such as an edge coupler 117, as shown, which will be used for coupling the incident laser light traveling through the photonics die 110 to the fiber array 115. It should be understood that each of the edge couplers 112, 117 may be bidirectional, as mentioned above, such that light may travel in either direction through the edge couplers. As will be described in detail below, light may travel bilaterally, i.e., forwards, and backwards, along the die and fiber channels 114, 124 as well, as an example.

As an example, each optical channel 114 may run parallelly along the integrated photonics die 110, as shown, such that each edge coupler 117 aligns collinearly along the edge of the die 110. Additionally, as shown, each edge coupler 117 may be parallelly and equally distributed on the integrated photonics die 110, such that a distance between a first optical channel (e.g., Ch 1) and a second optical channel (e.g., Ch 3) is twice a distance between a third optical channel (e.g., Ch 2) disposed between the first and the second optical channels, for example. It should be understood that the optical channels 114 need not run parallelly along the photonics die 110 nor need to be equally distributed on the photonics die 110, as described above.

In accordance with an aspect of the current invention, an optical alignment system 132 may be provided for optically aligning the photonics die 110 to the fiber array 115. The optical alignment system may comprise a set of at least two wavelength division multiplexing (WDM) couplers 120 and low-loss waveguide crossings ("waveguide crossings," "waveguide crossing loop") 121 for the passive alignment of the photonics die 110 and the fiber array 115. It should be understood that the term "crossing" as used herein refers to an overpass/underpass, and not an intersection, of waveguides, as shown. As shown as an example, two WDM couplers 120 may be provided on the photonics die 110, integrated onto the first (Ch 1) and fourth (Ch 4) channels 114. As shown, the waveguide crossings 121 may extend between the two WDM couplers 120, spanning across the four die channels 114, as an example. As shown, the optical joining of the waveguide crossings 121 and the WDM couplers 120 may form a waveguide cross port 122 and a bar port 130, by which light beams are directed to travel, as an example. It should be understood that more than two WDM couplers 120, and thus more than one waveguide crossing 121, may be utilized for optically aligning the photonics die 110 to the fiber array, as will be discussed in greater detail later. As will be discussed in greater detail when referring to FIG. 3, the WDM couplers 120 may function as multiplexing and demultiplexing optical components for the light traveling back and forth between the photonics die 110 and the fiber array 115.

As an aside, it may be possible to replace the WDM couplers 120 shown in FIG. 1 with tap couplers for the passive alignment of the photonics die 110 and the fiber array 115. However, such tap couplers added onto the channels 114 would introduce extra loss and wavelength dispersion into the channels 114, rendering the photonics die 110 sensitive to temperature and wavelength variation. A small tap ratio may be utilized to counter such optical loss on the channels 114, however, the small tap ratio may weaken the light passing through the tap couplers, making the detected transmitted light too weak for alignment purposes. As such, the receiver used in the fiber array alignment process would be required to be hypersensitive. Such requirements would introduce higher equipment costs. Thus, the WDM couplers 120 shown in FIG. 1 are preferred for the disclosed optical alignment method 101. As will be discussed in more detail below, the WDM couplers 120 negate any additional loss or wavelength dispersion that would be introduced by other couplers like the tap couplers described above.

As mentioned above, the optical alignment method 101 may be divided into two steps (two separate light-insertion steps) 105A, 105B utilizing the optical alignment system 132 described above for coupling the photonics die 110 to the fiber array 115. As shown in FIG. 1, two different light beams may be used, each light beam having a different wavelength, as will be discussed in greater detail when referring to FIG. 3. As such, a first light beam ("first light beam," "optical alignment light beam," "alignment beam," "first optical signal") 125A may be utilized during the first step 105A of the method 101, and then a second light beam ("second light beam," "operational light beam," "product operation light beam," "second optical signal") 104 may be utilized during the second step 105B, as an example. The method 101 may comprise placing the front 115A of the fiber array 115 adjacent to the photonics die 110 such that the fiber channels 124 abut and align to the edge couplers 117, as shown. The method, during the first step 105A, may further comprise launching the first light beam 125A, via an external laser source (not shown), for example, into the back end 115B of the fiber array 115, such that the first light beam 125A travels along a first fiber channel (Ch 1) 124 and into a first edge coupler 117A, as shown. As shown, as the first light beam 125A travels along the first die channel (Ch 1) 114, a majority of the first light beam 125A (or at least a portion thereof in the case that a tap coupler is used) is directed by the first WDM coupler 120A, based on the specific wavelength of the alignment beam 125A, into the first waveguide cross port 122A and thus along the waveguide crossings 121, as shown by 125B. As shown, as the first light beam 125B travels along the waveguide crossings 121, the first light beam 125B may cross over the second and third die channels (Ch 2, Ch 3) 114, in this example. The first light beam 125B may then be directed back onto the fourth die channel (Ch 4) 114 via a cross port 122B of the second WDM coupler 120B, as shown in FIG. 1. The first light beam 125B may then pass through an edge coupler 117D, as shown by 125C, and then travel along the fiber array channels (via Ch 4) 124 back toward a receiver (not shown), for example, at the back end 115B of the fiber array 115. The receiver (not shown) may be adapted to detect the first light beam 125C, and by detecting the intensity of the output optical signal 125C, while adjusting the relative positioning of the front 115A of the fiber array 115 to the photonics die 110, a preferred positioning may be determined.

The above described method operating during the first step 105A may result in the physical coupling of the fiber array 115 to the photonics die 110, such that a preferred positioning of the fiber array 115 to the photonics die 110 is determined. The second step 105B, as will be described below, may result in the aligning of a second light beam 104 (from a product operation laser, for example) to the photonics die 110 through an edge coupler 112 for subsequent product operation, as an example. The second step 105B may comprise launching the second light beam 104, via the product operation laser (not shown), for example, into the edge coupler 112, such that the second light beam 104 may travel within the photonics die 110 toward the fiber array 115, as shown. As shown, the second light beam 104 may be separated by the edge coupler 112, such that the light beam 104 branches a first time 113A and then a second time 113B, resulting in four distinct light beams 104A, as an example. Each light beam 104A may travel along the respective die channels 114 and sometimes may pass through the modulators 116, as shown. As the top and bottom light beams 104A traveling along Ch 1 and along Ch 4, respectively, approach the WDM couplers 120, the top and the bottom light beams 104A are directed into the bar ports 130 of the WDM couplers 120 into the bar ports 130, as shown, based on the specific wavelength of operation light beams 104A. The four light beams 104A may thus travel through the edge couplers 117, such that the light beams 104A are directed into the fiber array 115. As shown, the four light beams 104B may travel along the fiber channels 124 toward the receiver (not shown) at the back end 115B of the fiber array 115. The receiver (not shown) may be adapted to detect the exiting light beams 104C, which may then be used by the receiver for the given product application (e.g., optical communications, optical sensing, optical computing, etc.). Thus, via the second step 105B, the operational laser light 104, travelling through the photonics die 110, may be passively aligned to the photonics die 110 for the given photonics application, as mentioned above.

It should be understood that, should either of the launched light beams 104, 125A not be completely transmitted through the fiber array 115 and received at the output 115B, as shown, at least part of the above described alignment method 101 shall be considered unsuccessful. As such, the physical positioning of the front end 115A of the fiber array 115 with respect to the photonics die 110, and/or the physical positioning of the operation laser light 104 with respect to the photonics die 110, may need to be adjusted, such that the light beams 104, 125A may therefore substantially be transmitted into the fiber array 115, as shown in FIG. 1. It should be understood that the physical adjustments may alternatively be automated, via an external electrical system, for example. While the disclosed method 101 of optically aligning the photonics die 110 to the fiber array 115 is described above as being divided into two steps 105A, 105B, it should be noted that only the first step 105A is required for optically aligning the photonics die 110 to the fiber array 115.

Figure 2:
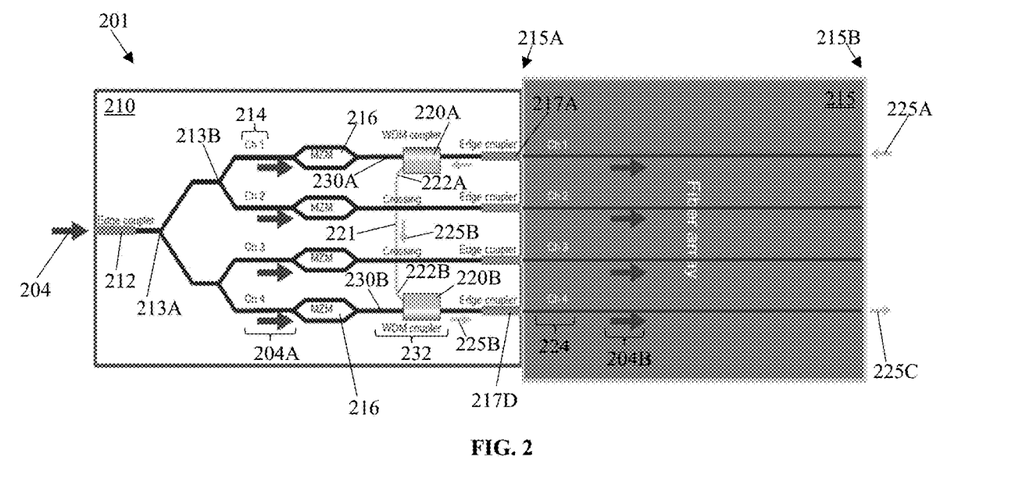
FIG. 2 is a diagram illustrating the optical alignment method of FIG. 1, combined into a single step, according to an aspect.

FIG. 2 is a diagram illustrating the optical alignment method 101 of FIG. 1, combined into a single step, according to an aspect. As shown in FIG. 2, the WDM coupler 220A, 220B and the waveguide crossings 221 may be thus adapted such that both incident light beams 204, 225A having different wavelengths may travel throughout the photonics die 210 and the fiber array 215 without interfering, and thus to optically align the photonics die 210 to the fiber array 215 in real time, as will be described below.

As shown in FIG. 2, the photonics die 210 and the fiber array 215 may comprise the exemplary optical components described previously when referring to FIG. 1. Additionally, as mentioned above, the optical alignment method 201 described in two distinct steps may be provided as a single step. As shown, the first light beam 225A may be launched into the fiber array 215, and the second light beam 204 may subsequently be launched into the edge coupler 212, as an example. The second light beam 204 may be divided and then branched in the same manner described above (via 213A, 213B) and the first light beam 225A may enter the photonics die 210 via the first edge coupler 217A, as shown. Per the method 201, the first light beam 225A and the second light beams 204A travel toward each other along the die channels 214, as shown. However, as mentioned above, because the WDM couplers 220A, 220B and the waveguide crossings 221 create two distinct wavelength paths via the cross ports 222A, 222B and the bar ports 230A, 230B, as shown, the first light beam 225A and the second light beams 204A are separated according to their wavelengths, and thus may not interfere. Thus, as described above, the first light beam 225B may travel across the waveguide crossings 221 and back into the fiber array 215 and the second light beams 204A may travel through the edge couplers 217 and then into the fiber array 215. Receiver(s) (not shown) positioned at the output of the fiber array 215 may be adapted to detect the output light beams 204B, 225C, as shown, such that the photonics die 210 is optically aligned with the fiber array 215 while the operational product light beams 204B are transmitted for the given photonics application. Thus, an advantage is that the photonics die may be optically aligned to the fiber array while transmitting an operating laser light beam.

As described above, the optical alignment method 201 shown in FIG. 2 may allow the photonics die 210 to optically couple to the fiber array 215, while being used to transmit operational laser light beams 204. As an example, in some photonics applications, it may be desirable to not glue/connect the fiber array 215 onto the die 210 before laser alignment (e.g., step 105B in FIG. 1), via the laser light 204. In such cases, it may be desirable to be able to adjust the position of the fiber array 215 in real time, and thus, would require the photonics die 210 to optically align to the moving fiber array 215 as well. As such, the above disclosed optical alignment method 201 would be particularly advantageous for such applications, since the method would allow the photonics die 210 to continue to transmit operating light beams 204 while the fiber array 215 changes positions, as an example.

Thus, an advantage of the optical alignment method is the enablement of real-time adjustment of the fiber array position while the die is operating. Another advantage is that, because only passive optical components are used in the optical alignment system, manufacturing costs and operational costs may be kept minimal. An additional advantage is that due to the low-loss nature of WDM couplers, transmission losses may be kept to a minimum (e.g., about 0.2 dB or less), and thus the need for hypersensitive end receivers may be negated. Another advantage is that the laser source providing the input light beam need only be turned on for product operation, rather than for optical alignment, which may thus reduce operational costs.

It should be understood that, as described previously when referring to FIG. 1, should the exiting alignment beam 225C not be received at the output 215B of the fiber array, physical positioning adjustments may need to be made between the photonics die and the fiber array. It should be noted that during such positioning adjustments, the input laser beam 204 need not be shut off, such that the product operation is not lost, thus maintaining the real-time adjustment described above. As will be described in greater detail later in this disclosure, the particular arrangement and number of WDM couplers 220A, 220B and waveguide crossings 221 shown in FIG. 2 may be alternatively provided in other exemplary arrangements/configurations.

Figure 3:
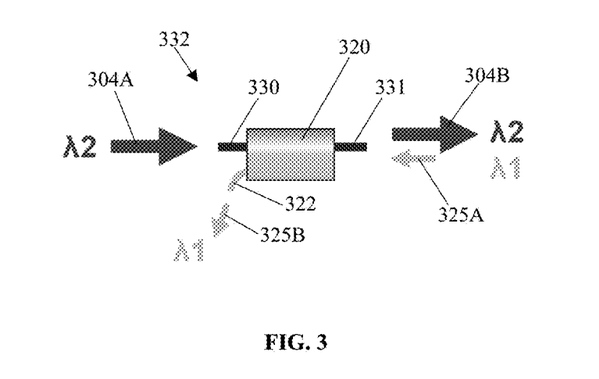
FIG. 3 illustrates an enlarged view of the wavelength division multiplexing coupler of FIG. 1, according to several aspects.

FIG. 3 illustrates an enlarged view of the wavelength division multiplexing coupler 120 of FIG. 1, according to several aspects. As mentioned above, the optical alignment system 332 disclosed herein may comprise WDM couplers 320 and low-loss waveguide crossings (shown by 121 in FIG. 1), as shown in FIG. 3. It should be understood that only a single WDM coupler 320 is shown in FIG. 3 for clarity. It should also be understood that, although the WDM coupler 320 is depicted as being a 1×2 coupler (i.e., one common port at one side and two divided wavelength ports at the other side), the WDM coupler 320 may be adapted in any suitable configuration as needed, such as, for example, 1×n, or n×1, where n is 3, 4, 5, 8, etc., as needed. It should also be understood that the WDM coupler 320 may be adapted to be 2×2, or 2×3, or any other configuration, for example.

As mentioned previously above when referring to FIG. 1, the WDM coupler 320 may operate as a multiplexer and as a demultiplexer. As shown in FIG. 3, the WDM coupler 320 optically joins the bar port 330 with the waveguide crossing (e.g., 121 in FIG. 1), thus creating two light paths, as described previously above. As such, the WDM coupler 320 may comprise two ports/wavelength paths: the bar port 330 and the cross port 322, each being joined to a common port 331, as shown. As shown in FIG. 3 as an example, two light beams may be traversed through the WDM coupler 320 via the common port 331, one light beam being the operating laser light beam 304A and the other being the alignment light beam 325A, as shown previously in FIGS. 1 & 2. As mentioned previously above when referring to FIG. 1, the light beams 304A, 325A may have their respective and different wavelengths, as shown. As shown in FIG. 3, let the alignment light beam 325A comprise a first wavelength $\lambda_1$ and let the operating light beam 304A comprise a second wavelength $\lambda_2$, as an example. The wavelengths $\lambda_1$, $\lambda_2$ should be different, as mentioned above, such that the two wavelengths, and thus the traveling light beams, may not interfere during the optical alignment or product operation processes. As an example, let the operation wavelength $\lambda_2$ be about 1310 nanometers (nm); as such, let the alignment wavelength $\lambda_1$ then be about 1550 nm. It should be noted that the alignment wavelength $\lambda_1$ may be essentially any wavelength suitably far (in value) from the operation wavelength $\lambda_2$ (e.g., 850 nm, 980 nm, etc., per this example). In this way, the WDM coupler 320 is adapted to only allow the light beams 304A having the operation wavelength $\lambda_2$ to transmit through the bar port 330, with negligible transmission loss, and through the common port 331, and thus, to only allow the light beams 325A having the alignment wavelength $\lambda_1$ to transmit through the cross port 322 from the common port 331, as shown. As indicated in FIGS. 1-2 previously, the WDM coupler 320 may be optically connected to the optical channels (e.g., 214) via the bar port 330 and the common port 331, respectively.

It should be understood that the respective light beams traversing toward the WDM coupler 320 shown in FIG. 3 may each approach from the opposite direction shown, i.e., from right to left or from left to right, for example. In such a scenario, the WDM coupler 320 may still function in the same manner as described above, directing the operational light beam 304B through the common port 331 and to the bar port 330, and diverting the alignment light beam 325B onto the cross port 322. Thus, when two (or more) WDM couplers 320 are paired with the waveguide crossings (e.g., 221), as shown in FIG. 2, for example, the WDM couplers 320 may multiplex and demultiplex the incoming light beams, as two light paths (e.g., 330 and 322) are conjoined into a single light path (e.g., 331), or one light path is separated into two light paths (see e.g., 220B in FIG. 2), respectively. As an example, the WDM coupler 320 described above may be realized using any suitable integrated photonics components, such as couplers, resonators, etc. As such, the disclosed optical alignment system 332 may be cost-effective and multi-purpose, able to be implemented for a wide variety of integrated photonics applications, as advantages.

Figure 4:
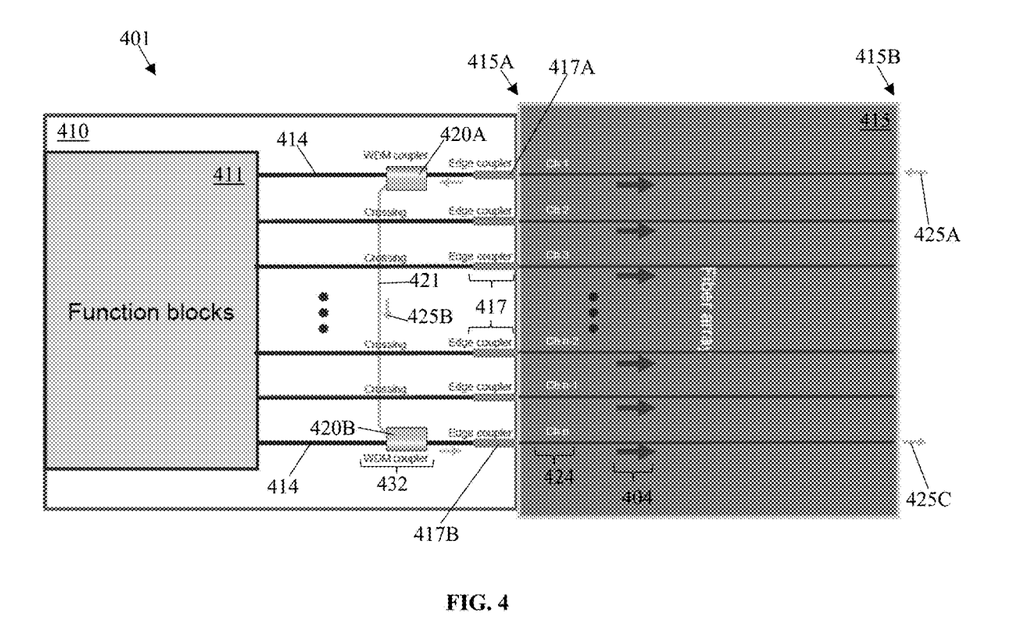
FIG. 4 is a diagram illustrating another example of a single-step method of optically aligning a multi-channel integrated photonics die to a fiber array, according to an aspect.

FIG. 4 is a diagram illustrating another example of a single-step method 401 of optically aligning a multi-channel integrated photonics die 410 to a fiber array 415, according to an aspect. As mentioned previously above when referring to FIG. 1, the photonics die 410 may comprise a plurality of die channels 414, the number of which being greater than four, as shown previously in FIG. 1, for example. As shown, the fiber array 415 may thus have a greater number of fiber channels 424, such that the number of die channels 414 and the number of fiber channels 424 is equal in this example. It should be understood, however, that the number of die channels 414 and the number of fiber channels 424 do not have to be equal. It should be noted that the edge coupler (e.g., 212 in FIG. 2), the branches (e.g., 213A, 213B), and the modulators (e.g., 216) have been replaced in this example by a Functional Blocks module 411, as shown. It should thus be understood that each of the aforementioned optical components shown in FIGS. 1 & 2 are hereby included in the diagram of FIG. 4 via the Functional Blocks module 411.

As shown in FIG. 4, the disclosed optical alignment method 401 may thus not be limited to optical coupling for a 4-channel integrated photonics die. The method 401 may be applied to larger photonics dies 410 (and therefore smaller photonics dies), such that to apply to 8-channel, 16-channel, 32-channel, etc. photonics dies, as shown, where the channel number n>=2. As an example, let the photonics die 410 be a 6-channel photonics die, such that n=6 in FIG. 4. As shown in FIG. 4, the 6-channel photonics die 410 may comprise an optical alignment system 432, spanning across the increased number of channels 414, as an example. As shown, the optical alignment system 432 may comprise a pair of WDM couplers 420A, 420B disposed at the channel ends Ch 1, Ch n and thus four waveguide crossings 421 extending between the pair of WDM couplers 420A, 420B. Per the optical alignment method 401, optical alignment light 425A may be provided into the fiber array 415 via the first channel (Ch 1) 424, and may travel along the fiber array 415 toward the top edge coupler 417A of the photonics die 410, as similarly described above. Subsequently, laser operation light 404 may be provided into the photonics die 410 and branched apart (occurring in the Function blocks module 411) and may travel along the die channels 414 toward the fiber array 415, as shown. The WDM coupler 420A may direct the optical alignment light 425A onto the waveguide crossings 421, as shown, and may direct one of the operation light beams 404 through to the top edge coupler 417A. The optical alignment light 425B may travel across the die channels 414 via the waveguide crossings 421 and exit the loop and travel via the WDM coupler 420B toward the bottom edge coupler 417B, such that the output optical alignment beam 425C may be detected by a receiver at the output end 415B. Thus, an advantage is that a larger photonics die having an increased number of channels may be optically aligned to the fiber array while transmitting an operating light beam.

Figure 5:
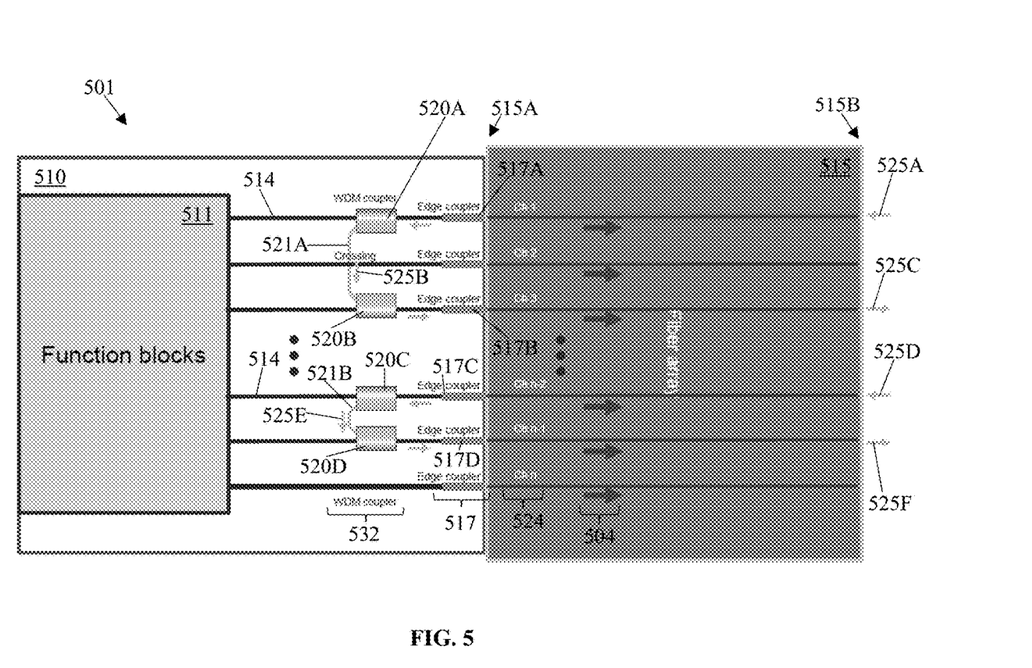
FIG. 5 is a diagram illustrating another example of a single-step optical alignment method, utilizing four wavelength division multiplexing couplers, according to an aspect.

FIG. 5 is a diagram illustrating another example of a single-step optical alignment method 501, utilizing four wavelength division multiplexing couplers 520A-520D, according to an aspect. As mentioned above when referring to FIG. 4, the photonics die 510 and the fiber array 515 may comprise any number of channels 514, where the channel number n>=2, as an example. As described above, the disclosed optical alignment method may be applied for photonics dies and fiber arrays having such n channels by providing at least a pair of WDM couplers at two of the channels and waveguide crossings over each of the intermediate channels. As will be described in detail below, the optical alignment method may utilize more than two WDM couplers and interconnecting waveguide crossings, as shown in FIG. 5.

As an example, let the photonics die 510 and the fiber array 515 each comprise six channels, such that n=6 in FIG. 5. As shown as an example, the photonics die 510 may be provided with an optical alignment system 532 comprising two pairs of WDM couplers and two separate waveguide crossing loops. As shown, let a first WDM coupler 520A be provided on the first channel Ch 1 and a second WDM coupler 520B be provided on the third channel Ch 3, with a first waveguide crossing loop 521A extending between the first WDM coupler 520A and the second WDM coupler 520B. Additionally, let a third WDM coupler 520C be provided on the fourth channel Ch n−2 and a fourth WDM coupler 520D be provided on the fifth channel Ch n−1, with a second waveguide crossing loop 521B extending between the third WDM coupler 520C and the fourth WDM coupler 520D. Thus, as shown, two input alignment light beams 525A, 525D having the same wavelength may be used with each pair of WDM couplers such that to optically align the photonics die 510 to the fiber array 515, as will be described below.

As shown in FIG. 5, the optical alignment method 501 may comprise launching the optical alignment lights 525A, 525D into the fiber array 515, such that the first optical alignment light beam 525A travels along Ch 1 and the second optical alignment light beam 525D travels along Ch n−2, as an example. Subsequently, laser operation light 504 may be inserted into the photonics die 510 (occurring within the Function blocks module 511), such that the separated light beams 504 travel along the die channels 514 toward the edge couplers 517. As shown, after the first optical alignment light beam 525A exits the first edge coupler 517A, the first WDM coupler 520A may direct the light beam 525A through the first waveguide crossing loop 521A, such that the first three Ch 1-Ch 3 die channels 514 may be optically coupled to the fiber array channels 524, for example. Furthermore, as shown, after the second optical alignment beam 525D exits the edge coupler 517C, the third WDM coupler 520C may direct the light beam 525D through the second waveguide crossing loop 521B. The second optical alignment beam 525E may travel through the fourth WDM coupler 520D and back through the fiber array 515 via the edge coupler 517D, for example, such that the last three Ch n−2-Ch n channels of the photonics die 510 and the fiber array 515 may be optically coupled. As shown, the operation light beams 504 may pass through the respective WDM couplers 520A-520D and travel through the edge couplers 517 and into the fiber array channels 524, such that to reach the external optical device (not shown) at the output 515B of the fiber array 515 for product operation.

It should be understood that the two pairs of WDM couplers may be provided on channels 514 other than those shown in FIG. 5, and in alternative arrangements. For example, the fourth WDM coupler 520D may be provided on the sixth channel Ch n, with the second waveguide crossing loop 521B extending between the third WDM coupler 520C and the fourth WDM coupler 520D. It should also be understood that a minimum of two WDM couplers are provided on the photonics die such that at least one full waveguide crossing loop can be established for optical alignment. Thus, as demonstrated above, the number of WDM couplers provided on the photonics die is not limited to two, and, as shown in FIG. 5, the WDM couplers do not have to be provided at the first channel (e.g., Ch 1) and the last channel (e.g., Ch n). Thus, since the WDM couplers are not required to be positioned at particular channels on the photonics die, an advantage is the versatility of the disclosed optical alignment system, which may provide increased die design freedoms. An additional advantage is that, because the WDM couplers are adapted to multiplex and demultiplex traveling light beams having different wavelengths, interference between operating wavelengths and alignment wavelengths may be avoided. The ability to use more than two WDM couplers, placed at any channel on the photonics die, may enable the use of more than one type of input optical alignment light beam, the input optical alignment light beams having different wavelengths, as will be described in detail below.

Figure 6:
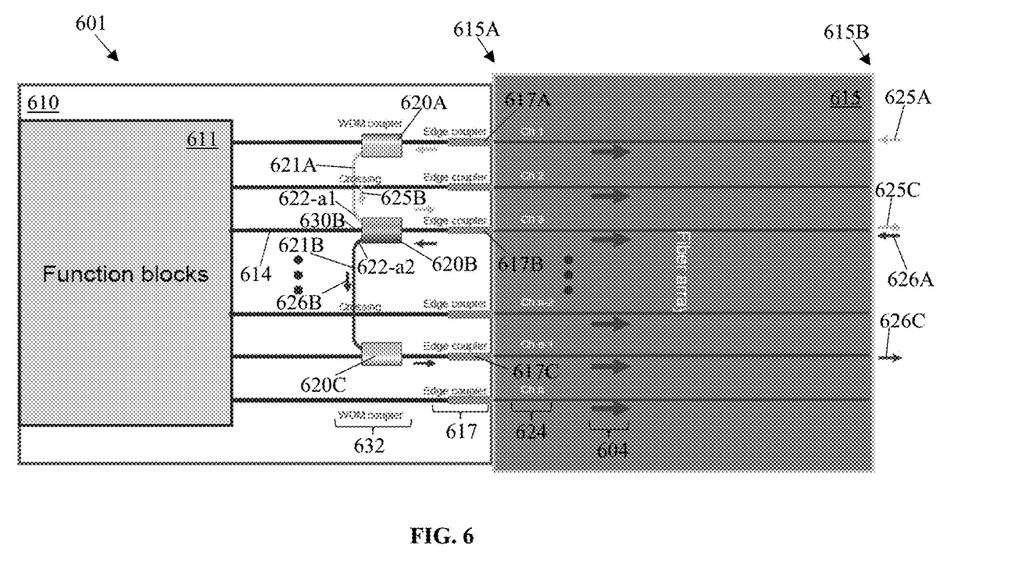
FIG. 6 is a diagram illustrating another example of a single-step optical alignment method, utilizing two alignment light beams having different wavelengths, according to an aspect.

FIG. 6 is a diagram illustrating another example of a single-step optical alignment method 601, utilizing two alignment light beams 625A, 626A having different wavelengths, according to an aspect. As mentioned above when referring to FIG. 5, the optical alignment system (e.g., 532) may comprise more than two WDM couplers for optically aligning the photonics die to the fiber array. As will be described in detail below, the WDM coupler (e.g., 620B) may be adapted to comprise three light ports/wavelength paths, such that three different light beams may traverse through the WDM coupler via the common port (e.g., 331 in FIG. 3), as an example.

As shown in FIG. 6, the photonics die 610 may be provided with an optical alignment system 632 comprising three WDM couplers 620A-620C, with the first WDM coupler 620A being provided on a first die/waveguide channel Ch 1, the second WDM coupler 620B being provided on another die channel Ch 3, and the third WDM coupler 620C being provided on another die channel Ch n−1. Again, let the photonics die 610 comprise six die channels 614, as an example, such that n=6 in FIG. 6. As shown, each adjacent pair of WDM couplers 620A-620C may be connected by a waveguide crossing loop 621A, 621B. As an example, the first waveguide crossing loop 621A may extend between the first WDM coupler 620A and the second WDM coupler 620B, and the second waveguide crossing loop 621B may extend between the second WDM coupler 620B and the third WDM coupler 620C, as shown. As will be discussed in more detail below, the first and the second waveguide crossings 621A, 621B may be adapted to optically guide light beams having particular wavelengths, such that a first wavelength may traverse through crossing 621A and a second wavelength may traverse through crossing 621B. As such, the second WDM coupler 620B may be adapted to support three bidirectional light ports, as shown, through which the three different light beams 604, 625A, 626A may travel.

As described previously above when referring to FIG. 3, the WDM coupler may comprise a bar port (e.g., 330) through which the operational light beam may travel, and a cross port (e.g., 322) through which the alignment light beam may travel. As mentioned previously above, the WDM coupler may be configured as a 1×3 coupler, such that the WDM coupler comprises three wavelength ports connected to a single common port, as shown in FIG. 6. As shown, the second WDM coupler 620B may comprise a first cross port 622-a1 connecting to the first waveguide crossing 621A, and a second cross port 622-a2 connecting to the second waveguide crossing 621B. As also mentioned above, each waveguide crossing 621A, 621B may be adapted for carrying light beams having a particular wavelength. As an example, let the first alignment beam 625A comprise a first wavelength (e.g., 1550 nm) and let the second alignment beam 626A comprise a second wavelength (e.g., 980 nm); the operational light beams 604 may thus each comprise a suitably different wavelength (e.g., 1310 nm). As such, the first cross port 622-a1 may be adapted to allow only light beams having the first wavelength, such that only the first alignment light beams 625A may travel through the cross port 622-a1, and thus the first waveguide crossing 621A. Similarly, as an example, the second cross port 622-a2 may be adapted to allow only light beams having the second wavelength, such that only the second alignment beams 626A may travel through the cross port 622-a2, and thus the second waveguide crossing 621B. Thus, the bar port 630B may be configured to allow only the operational light beams 604 to travel through, as shown in FIG. 6.

As an example, it may be advantageous or desired to position two or more devices (e.g., optical sensors, light signal receivers, etc.), rather than a single device, at the output 615B of the fiber array 615 for product operation. In such cases, the operational light beams 604 transmitted from the photonics die 610 to the fiber array 615 may be utilized by the two or more devices (not shown) for various optical applications (e.g., optical sensing, optical communications, etc.). As such, the single photonics die 610 may be adapted for operating multiple optical devices (not shown) via the fiber array 615 at a single time. Furthermore, the fiber array 615 may comprise a plurality of distinct types of fiber channels 624, such as, for example, single mode fiber channels, multimode fiber channels, PM fiber channels, plastic fiber channels, etc. Thus, a fiber array 615 having, for example, both multimode and single mode fiber channels 624 may utilize alignment light beams having different wavelengths, as mentioned above. As an example, let the first alignment beam 625A correspond to a first device/product, and let the second alignment beam 626A correspond to a second device/product. As will be described in detail below, the disclosed optical alignment method 601 may enable the real-time optical coupling of the photonics die 610 to the fiber array 615, such that multiple devices may be operated at once.

As an example, the two alignment light beams 625A, 626A may be utilized for optically aligning the photonics die 610 to the fiber array 615, such that operational light beams 604 transmitted via the photonics die 610 may simultaneously operate the two devices (not shown) at the output 615B of the fiber array 615. As shown, the two alignment light beams 625A, 626A may be launched into the back end 615B of the fiber array 615, such that the first light beam 625A travels along Ch 1 and the second light beam 626A travels along Ch 3, as an example. The operational laser light 604 may be transmitted via the photonics die 610 as described above, such that the separated light beams 604 (occurring within the Function blocks module 611) travel along the die channels 614 toward the edge couplers 617, as shown. After the first alignment light beam 625A exits the top edge coupler 617A, the first WDM coupler 620A may direct the light beam 625A onto the first waveguide crossing 621A, such that the first light beam travels a loop along the first waveguide crossing 621A, as shown at 625B. The first alignment beam 625B may be directed by the second WDM coupler 620B via the first cross port 622-a1 back into the fiber array 615 along Ch 3, as shown. During this time, the second alignment light beam 626A may exit the edge coupler 617B and be traversed onto the second cross port 622-a2. Because the first light beam 625B and the second light beam 626A comprise different wavelengths, as mentioned above, the two beams do not interfere along Ch 3. The second WDM coupler 620B may direct the second light beam 626A through the second waveguide crossing 621B, as shown, such that the second light beam may travel a loop toward the third WDM coupler 620C, shown at 626B. At the output of the third WDM coupler 620C, the second alignment beam 626B may be directed onto the fiber channel Ch n−1 via the edge coupler 617C, as shown, such that the exiting second alignment beam 626C is received by an output receiver (not shown). The operational light beams 604 traveling along the first die channel Ch 1, the third die channel Ch 3, and the fifth die channel Ch n−1 may be directed by the WDM couplers 620A-620C onto the respective bar ports (e.g., 630B) and through the edge couplers 617 into the fiber array channels 624, as shown. Thus, the disclosed method 601 may allow the optical alignment of the fiber array 615 and the photonics die 610, such that two devices (not shown) may be operated via the operating light beams 604 at the same time.

Thus, an advantage is that the disclosed optical alignment system may allow multiple devices to optically pair with the photonics die via the fiber array in real time. Another advantage is that the photonics die may simultaneously operate more than on device at a time, decreasing operational costs associated with having multiple photonics dies. It should be understood that, as similarly mentioned above when referring to FIG. 5, the WDM couplers 620A-620C may be provided on other channels 614 than those shown in FIG. 6. It should also be understood that, for larger photonics dies having greater numbers of channels, more WDM couplers may be provided for operating greater numbers of optical devices in the manner described above.

Figure 7:
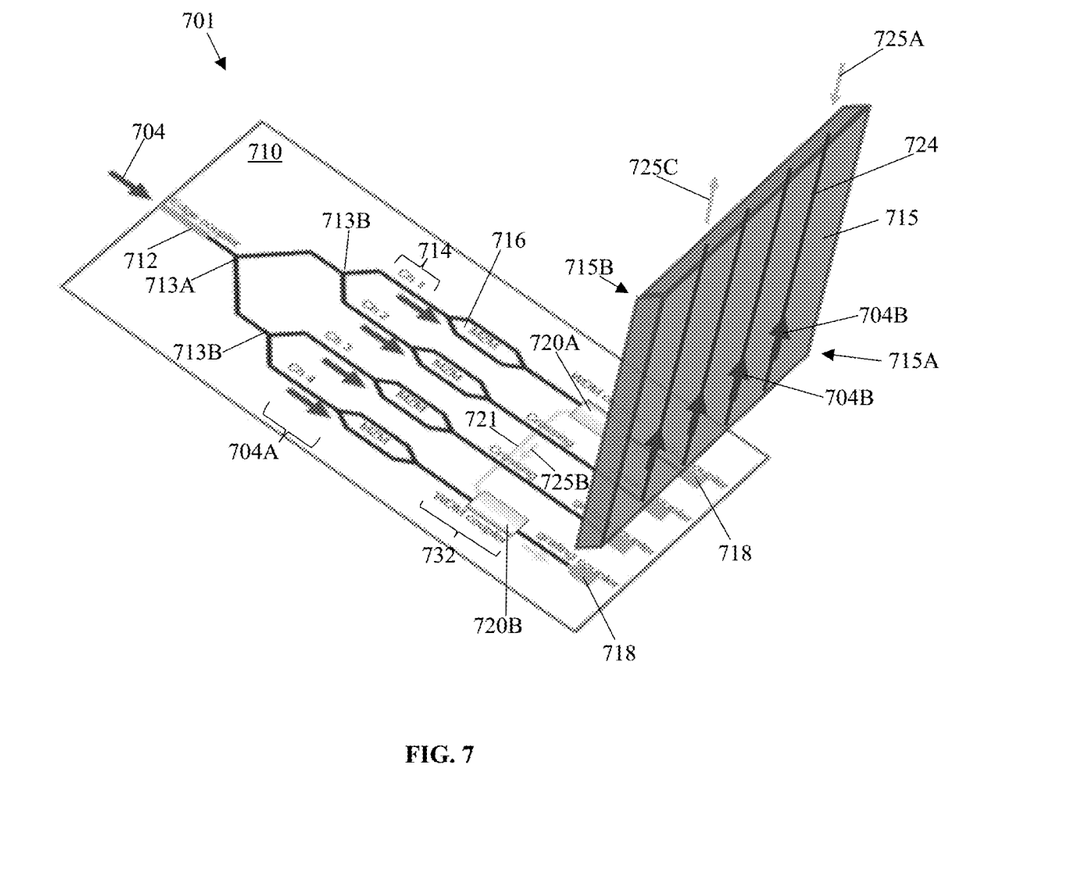
FIG. 7 is a diagram illustrating an example of a single-step method of optically aligning a multi-channel integrated photonics die, having grating couplers, to a fiber array, according to an aspect.

FIG. 7 is a diagram illustrating an example of a single-step method 701 of optically aligning a multi-channel integrated photonics die 710, having grating couplers 718, to a fiber array 715, according to an aspect. As shown as an example, the photonics die 710 may alternatively be provided with the grating couplers 718 instead of the edge couplers (e.g., 117) shown previously in FIGS. 1-6. As shown in FIG. 7, the grating couplers 718 may be provided on each optical channel 714 and may be arranged collinearly on the integrated photonics die 710, as an example. As will be discussed in detail below, the optical alignment system and method disclosed herein may be applied and operated in the same manner for this alternative photonics die embodiment 710.

As shown in FIG. 7, the photonics die 710 may be provided with an optical alignment system 732 comprising two WDM couplers 720A, 720B and a waveguide crossing 721 extending between them. As an example, the first WDM coupler 720A may be provided on a first die channel Ch 1 and the second WDM coupler 720B may be provided on a fourth die channel Ch 4, such that the waveguide crossing 721 crosses over Ch 2 and Ch 3 of the channels 714, as shown. As is known, a grating coupler comprises notches in the waveguide surface that create a diffraction grating, such that light that is diffracted off the surface will constructively interfere toward a certain direction. As shown in FIG. 6, the input operational light beams 704A may diffract off the grating couplers 718 and enter the fiber array channels 724. As an example, the grating couplers 718 may allow the photonics die 710 to be used in optics applications where the fiber array or optical fiber is tilted above the surface of the photonics die 710 (i.e., for vertical coupling), rather than abutted along the edge couplers (e.g., 117) of the photonics die (i.e., in-line coupling). For such applications, the optical alignment system 732 may accommodate the grating couplers 718, as shown, such that the alignment light 725A coupled into the photonics die 710 may be directed through the waveguide crossing loop 721 and the WDM couplers 720A, 720B, in the same manner described herein above, such that to optically couple the photonics die 710 to the tilted fiber array 715. In the same manner, the product operation light beams 704A may be diffracted and coupled into the fiber array 715, such that the device (not shown) at the output 715B of the fiber array 715 may receive the output light beams 704B.

Thus, an advantage is that the disclosed optical alignment method is not limited to photonics dies having edge couplers but may be applied to photonics dies having grating couplers as well, increasing the overall applicability and usability of the method. While the grating couplers 718 are depicted in FIG. 7 as being collinearly aligned to an edge of the photonics die 710, due to the functionality of each grating coupler, the grating couplers 718 may be optically positioned at any point along the optical channels 714, while still maintaining a collinear alignment.

It should be understood that, as used throughout this application, the terms "two-step" and "single-step" or "one-step" do not refer to the individual method steps described herein above, but rather refer to the separate or simultaneous steps taken for inputting the individual light beams into the photonics die and/or the fiber array. It should also be understood that, as used herein, the optical alignment system and method may be applied for photonics dies having any type of edge coupler, such as, for example, tilted edge-couplers, inverted-tapers, etc. Furthermore, it should be understood that the optical alignment system and method described herein may be applied for photonics dies having any type of grating coupler, such as, for example, polarization insensitive couplers, single polarization couplers, etc. It should also be understood that the disclosed optical alignment system and method may be applied for integrated photonics dies manufactured via various semiconductor platforms, such as silicon on insulator, silicon dioxide, silicon nitride, indium phosphide, gallium arsenide, etc., as examples.

It should be understood that in each of the figures of the drawings, the edge of the photonics die is depicted as already being physically aligned to the front of the fiber array for clarity. It should also be understood that although the photonics die described and shown throughout the figures above appears planar in a single layer, the photonics die and the fiber array may comprise a multi-layer or stacked arrangement, with each layer comprising the same optical components described herein. It should therefore also be understood that the photonics die and the fiber array do not necessarily have to be manufactured and arranged in a planar formation; for example, the photonics die and the fiber array may be arranged circularly, as long as the respective channels align.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having,"

"containing," "involving," and the like are to be understood to be open-ended, i.e., to mean including but not limited to. Only the transitional phrases "consisting of" and "consisting essentially of," respectively, are closed or semi-closed transitional phrases with respect to claims.

As used herein above, the phrase "multi-channel integrated photonics die," including its equivalents, refers to a photonic circuit integrated on a single chip and comprising multiple integrated optical components. Non-limiting examples of such integrated optical components include optical couplers, waveguides, modulators, filters, or a combination thereof, among other examples, as used in this application. Additionally, the term "couple" as used herein is to be understood as meaning "traverse" or "cause to travel" in reference to optical light signals. As also used herein above, the term "wavelength" refers to a traveling light wave having a particular wavelength, or to the particular length of a traveling light wave. The conventional meanings of "light wave" and "wavelength" are thus used interchangeably herein.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An integrated photonics die comprising:
   a first and a second optical channels extending a length of the integrated photonics die, the first optical channel comprising a first bidirectional port, and the second optical channel comprising a second bidirectional port, both the first and second optical channels being adapted to carry a corresponding operational optical signal during the operation of the integrated photonics die;
   a first and a second wavelength division multiplexing (WDM) couplers each comprising a bar port, a cross port, and a common port, the first and the second WDM couplers being optically connected to the first and the second optical channels, respectively, via the bar ports and the common ports; and
   a waveguide crossing optically connecting the cross ports of the first and the second WDM couplers;
   wherein an alignment optical signal being launched in a direction opposite the operational optical signals from a corresponding fiber channel of a fiber array into the first optical channel at the first bidirectional port is caused to be coupled out of the first optical channel at the cross port of the first WDM-coupler, such that to be propagated through the waveguide crossing, the alignment optical signal then being coupled into the second optical channel at the cross port of the second WDM coupler, the alignment optical signal subsequently being caused to exit from the second optical channel at the second bidirectional port in the same direction as the operational optical signals, back into another corresponding fiber channel of the fiber array,
   thereby, the integrated photonics die being adapted to allow the first and second optical channels to be aligned with corresponding fiber channels within the fiber array, and to facilitate real-time optical alignment of the integrated photonics die with the fiber array.

2. The integrated photonics die of claim 1, further comprising:
   at least a third optical channel located between the first and the second optical channels, the third optical channel having a third bidirectional port;
   wherein the first, the second, and the third bidirectional ports are parallel and equally distributed on the integrated photonics die, such that a distance between the first and the second bidirectional ports is twice a distance between the third and the second bidirectional ports.

3. The integrated photonics die of claim 2, wherein the first, the second, and the third bidirectional ports are edge couplers.

4. The integrated photonics die of claim 3, wherein the edge couplers are located on a same side of the integrated photonics die.

5. The integrated photonics die of claim 2, wherein the first, the second, and the third bidirectional ports are grating couplers.

6. The integrated photonics die of claim 5, wherein the grating couplers are collinearly arranged on the integrated photonics die.

7. The integrated photonics die of claim 1, wherein:
the first WDM coupler is adapted to:
couple optical signals having a first wavelength from the common port into the cross port; and
couple optical signals having a second wavelength from the bar port into the common port; and
the second WDM coupler is adapted to:
couple optical signals having the first wavelength from the cross port into the common port; and
couple optical signals having the second wavelength from the bar port into the common port.

8. The integrated photonics die of claim 7, wherein the first wavelength and the second wavelength are different in value.

9. A system for optically aligning an integrated photonics die to a fiber array, the fiber array comprising a first and a second fiber channels, the system comprising:
the integrated photonics die having:
a first and a second optical channels;
a first and a second wavelength division multiplexing (WDM) couplers each comprising a bar port, a cross port, and a common port, the first and the second WDM couplers being optically connected to the first and the second optical channels, respectively, via the bar ports and the common ports; and
a waveguide crossing optically connecting the cross ports of the first and the second WDM couplers;
the system being adapted to couple a first optical signal received from the first fiber channel and having a first wavelength into the cross port of the first WDM coupler and thus into the waveguide crossing, the first optical signal being propagated from the waveguide crossing into the cross port of the second WDM coupler, and thus being coupled into the second optical channel, the first optical signal being subsequently coupled into the fiber array via the second fiber channel.

10. The system of claim 9, wherein the system is further adapted to couple a second optical signal having a second wavelength into the bar port of one of the first and the second WDM couplers and into the common port of one of the first and the second WDM couplers, the second optical signal then being coupled into one of the first and the second fiber channels of the fiber array.

11. The system of claim 10, wherein the first wavelength and the second wavelength are different in value.

12. The system of claim 10, wherein the integrated photonics die further comprises:
a first bidirectional port disposed on the first optical channel and a second bidirectional port disposed on the second optical channel, the first and the second bidirectional ports being aligned to an edge of the integrated photonics die;
wherein the first and the second bidirectional ports are adapted to receive and transmit one of the first and the second optical signals; and
wherein the first optical signal and the second optical signal are each coupled back into one of the first and the second fiber channels via one of the first and the second bidirectional ports.

13. A method of optically aligning an integrated photonics die to a fiber array, the fiber array comprising a first and a second fiber channels, the method comprising the steps of:
receiving the integrated photonics die, the integrated photonics die comprising:
a first and a second optical channels, the first optical channel comprising a first bidirectional port, and the second optical channel comprising a second bidirectional port;
a first and a second wavelength division multiplexing (WDM) couplers each comprising a bar port, a cross port, and a common port, the first and the second WDM couplers being optically connected to the first and the second optical channels, respectively, via the bar ports and the common ports; and
a waveguide crossing optically connecting the cross ports of the first and the second WDM couplers;
aligning an end of the fiber array to an edge of the integrated photonics die, such that the first and the second fiber channels at least partially align with the first and the second bidirectional ports;
launching an optical signal from the first fiber channel into the first optical channel via the first bidirectional port; and
detecting at least a portion of the optical signal at the second fiber channel, the at least a portion of the optical signal being coupled from the first optical channel to the second optical channel via the first and the second WDM couplers and the waveguide crossing, the at least a portion of the optical signal subsequently being coupled from the second optical channel into the second fiber channel via the second bidirectional port.

14. The method of claim 13, further comprising launching a second optical signal into one of the first and the second optical channels, the second optical signal being coupled into one of the first and the second fiber channels via one of the first and the second bidirectional ports.

15. The method of claim 13, wherein the launching an optical signal from the first fiber channel into the first optical channel is performed using a laser source.

16. The method of claim 13, wherein:
the first WDM coupler is adapted to:
couple optical signals having a first wavelength from the common port into the cross port; and
couple optical signals having a second wavelength from the bar port into the common port; and
the second WDM coupler is adapted to:
couple optical signals having the first wavelength from the cross port into the common port; and
couple optical signals having the second wavelength from the bar port into the common port.

17. The method of claim 13, wherein the first and the second bidirectional ports are edge couplers.

18. The method of claim 13, wherein the first and the second bidirectional ports are grating couplers.

19. The method of claim 13, wherein the detecting at least a portion of the optical signal at the second fiber channel is performed using a photodetector.

20. The method of claim 13, wherein the integrated photonics die further comprises:
at least a third optical channel located between the first and the second optical channels, the third optical channel having a third bidirectional port;
wherein the first, the second, and the third bidirectional ports are parallel and equally distributed on the integrated photonics die, such that a distance between the first and the second bidirectional ports is twice a distance between the third and the second bidirectional ports.

* * * * *